United States Patent
Birch

(10) Patent No.: US 8,775,254 B2
(45) Date of Patent: Jul. 8, 2014

(54) INTEGRATED AND SYNCHRONIZED CROSS PLATFORM DELIVERY SYSTEM

(71) Applicant: James R. Birch, Spokane, WA (US)

(72) Inventor: James R. Birch, Spokane, WA (US)

(*) Notice: Subject to any disclaimer, the term of this patent is extended or adjusted under 35 U.S.C. 154(b) by 0 days.

(21) Appl. No.: 13/683,739

(22) Filed: Nov. 21, 2012

(65) Prior Publication Data

US 2013/0173394 A1    Jul. 4, 2013

Related U.S. Application Data

(63) Continuation of application No. 13/467,984, filed on May 9, 2012, now abandoned, which is a continuation of application No. 12/072,130, filed on Feb. 22, 2008, now abandoned.

(60) Provisional application No. 60/903,148, filed on Feb. 22, 2007.

(51) Int. Cl.
*G06Q 30/00* (2012.01)
*G06Q 30/02* (2012.01)

(52) U.S. Cl.
CPC ........ *G06Q 30/0255* (2013.01); *G06Q 30/0261* (2013.01); *G06Q 30/0269* (2013.01); *G06Q 30/0251* (2013.01)
USPC .................. 705/14.53; 705/14.58; 705/14.66; 705/14.49

(58) Field of Classification Search
USPC ...................................... 705/14.66
See application file for complete search history.

(56) References Cited

U.S. PATENT DOCUMENTS

| | | | |
|---|---|---|---|
| 6,160,545 A | 12/2000 | Eyer et al. | |
| 6,216,129 B1 | 4/2001 | Eldering | |
| 6,298,330 B1 * | 10/2001 | Gardenswartz et al. | ... 705/14.25 |
| 6,298,348 B1 | 10/2001 | Eldering | |
| 6,324,519 B1 | 11/2001 | Eldering | |
| 6,457,010 B1 | 9/2002 | Eldering et al. | |
| 6,560,578 B2 | 5/2003 | Eldering | |
| 6,615,039 B1 | 9/2003 | Eldering | |
| 6,704,930 B1 | 3/2004 | Eldering et al. | |
| 6,714,917 B1 | 3/2004 | Eldering et al. | |
| 6,820,277 B1 | 11/2004 | Eldering et al. | |
| 7,263,714 B2 | 8/2007 | Lowthert et al. | |
| 2001/0030644 A1 | 10/2001 | Allport | |
| 2001/0037500 A1 | 11/2001 | Reynolds et al. | |
| 2002/0053078 A1 | 5/2002 | Holtz et al. | |
| 2002/0083435 A1 | 6/2002 | Blasko et al. | |
| 2002/0104083 A1 | 8/2002 | Hendricks et al. | |
| 2004/0189873 A1 | 9/2004 | Konig et al. | |
| 2004/0194130 A1 | 9/2004 | Konig et al. | |
| 2004/0237102 A1 | 11/2004 | Konig et al. | |
| 2004/0244035 A1 | 12/2004 | Wright et al. | |

(Continued)

*Primary Examiner* — John G Weiss
*Assistant Examiner* — Scott C Anderson
(74) *Attorney, Agent, or Firm* — Clayton, Howarth & Cannon, P.C.

(57) ABSTRACT

A system and method for delivering targeted advertisements to consumers by inserting the targeted advertisements into a content stream. The content stream may be monitored for advertisement placement opportunities, such that the targeted advertisements may be seamlessly inserted into the content stream to replace an advertisement in the content stream. The content stream's owner and/or provider may be identified such that revenues from the targeted advertisement may be shared with the owner's and/or providers. The system and method are further able to use a biometric recognition technique to verify that the targeted advertisement is actually delivered to the targeted consumer. Another aspect allows the targeted advertisements to be delivered across multiple platforms in accordance with an advertising campaign.

7 Claims, 8 Drawing Sheets

(56) References Cited

U.S. PATENT DOCUMENTS

| | | |
|---|---|---|
| 2005/0149968 A1 | 7/2005 | Konig et al. |
| 2005/0177847 A1 | 8/2005 | Konig et al. |
| 2005/0199810 A1 | 9/2005 | Hiller et al. |
| 2006/0053049 A1 | 3/2006 | Nolan |
| 2006/0161947 A1 | 7/2006 | Laksono et al. |
| 2006/0195859 A1 | 8/2006 | Konig et al. |
| 2006/0195860 A1 | 8/2006 | Eldering et al. |
| 2006/0248569 A1 | 11/2006 | Lienhart et al. |
| 2007/0136742 A1 | 6/2007 | Sparrell |
| 2007/0244750 A1 | 10/2007 | Grannan et al. |
| 2008/0155587 A1 | 6/2008 | Sokola et al. |

\* cited by examiner

INTEGRATED AND SYNCHRONIZED CROSS PLATFORM DELIVERY SYSTEM

CROSS-REFERENCE TO RELATED APPLICATIONS

This application is a continuation of U.S. patent application Ser. No. 13/467,984, filed May 9, 2012, which is a continuation of U.S. patent application Ser. No. 12/072,130, filed Feb. 22, 2008, which claims the benefit of U.S. Provisional Application No. 60/903,148, filed Feb. 22, 2007, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Invention

The present disclosure relates generally to a system and method for delivering a content stream and advertisements to a user, and more particularly, but not necessarily entirely, to delivering targeted advertisements to a user.

2. Description of Related Art

Traditional advertisement methods involve broadcasting advertising and programming material together to multiple recipients in the same geographic area. For example, advertising and programming material may be broadcast through a television or radio station in a content stream.

For both television and radio advertising, historically, advertisers have been forced to purchase time slots in delivering their message. Time slots are selected based on demographic information associated with the content. A.C. Nielson is the industry's main provider of such demographic information for television. For example, in order for an advertiser to reach a 35-year old woman, the advertisers may be forced to advertise on multiple channels where the research indicates a significant presence of such women. This is an indirect approach to reaching the target audience with built in inefficiencies and redundancies. Furthermore, the advertiser is unable to create direct integrated and synchronized interactions between different advertising platforms. Television and radio are one-way mediums that permit low cost distribution to a large geographic area. That is, all households within the geographic area receive the same programming and advertisements. The advertisement is the same regardless of who is the actual viewer. Satellite and cable delivery systems may have the ability to provide customized advertisements based on a more refined geographic region. However, these media lack the ability of targeting individual users and doing so across a plurality of platforms.

Internet Protocol Television ("IPTV") is another medium available for advertising. Using IPTV, programming is directly streamed from a remote server to a household. Although IPTV's ability to target a unique household is greater than the previous broadcast methods described above, IPTV is still unable to synchronize or integrate an advertising campaign across other platforms.

Further, there is presently little or no ability to synchronize advertising across different platforms. For example, if an advertiser wanted to combine a television advertisement with a follow-up direct mail piece, the advertiser would blanket advertisements on multiple channels during multiple time slots in trying to reach the target audience. At some point, once the advertiser felt that the saturation level had been reached, a follow up direct mail piece would be sent out. The advertiser has no way of confirming if the television advertisement had been seen by the targeted individual prior to the direct mail piece arriving. In fact, it's quite possible that the direct mail piece would arrive before the targeted individual would even see the advertisement.

As mentioned, television and direct mail represent two different platforms that are available to advertisers. Internet advertisements through banner ads and search result placements are other platforms that are available to advertisers. In addition, DVD/VHS, Gaming, PVR, and IPTV are additional platforms which can be selected by advertisers in reaching their target audiences. However, there is no ability to integrate or synchronize these platforms based on current technologies, platforms, and configurations.

The prior art is thus characterized by several disadvantages that are addressed by the present disclosure. The present disclosure minimizes, and in some aspects eliminates, the above-mentioned failures, and other problems, by utilizing the methods and structural features described herein. The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
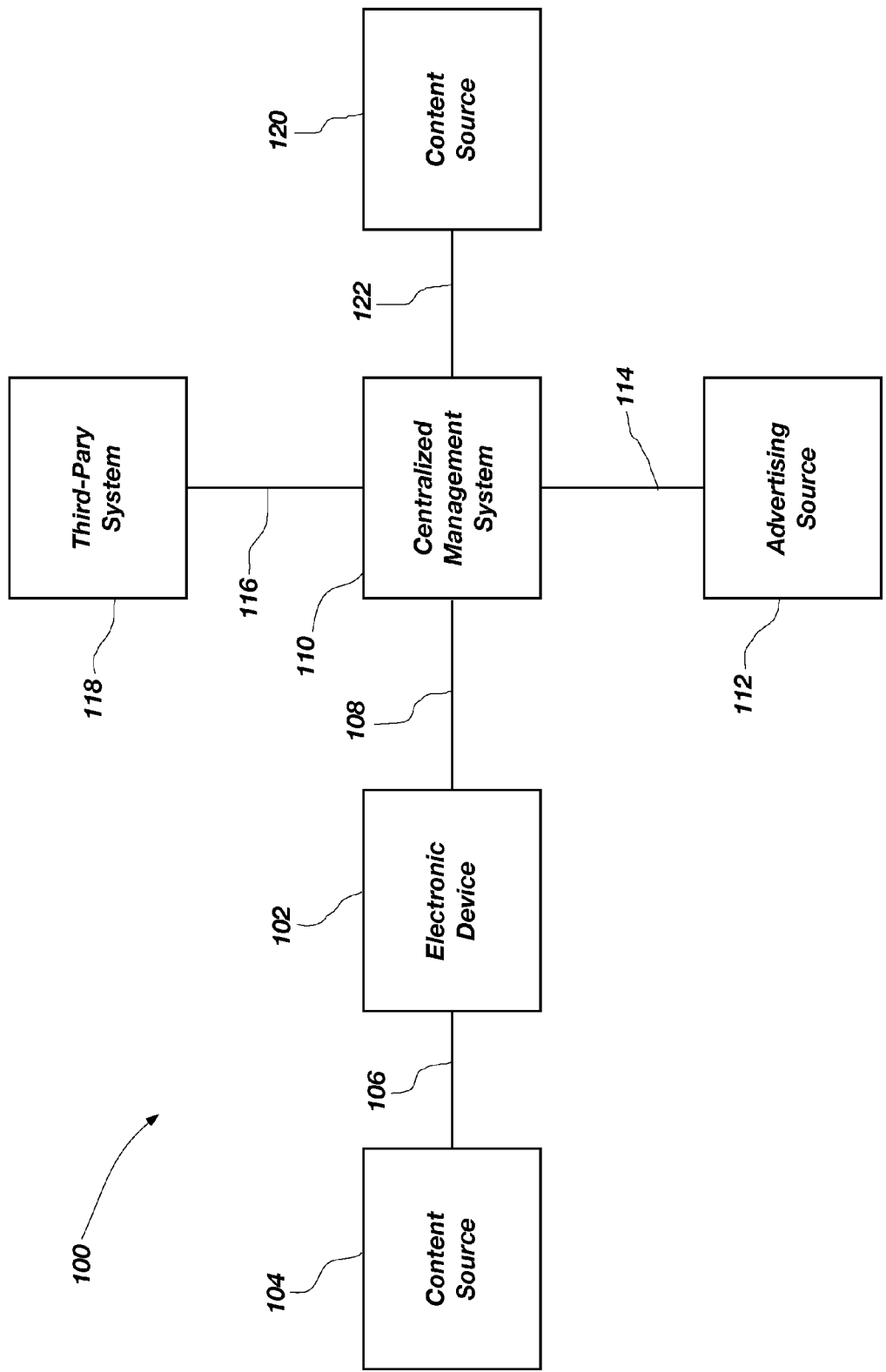
FIG. 1 is a diagram illustrating one embodiment of a system pursuant to the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "containing," "characterized by," and grammatical equivalents thereof are inclusive or open-ended terms that do not exclude additional, unrecited elements or method steps.

As used herein, the term "content stream" means information of an audio and/or visual nature that is delivered from one device to another device. The content stream may be carried in a signal, including electromagnetic signals and light based signals. The information in the content stream may include both programming and advertisements that can be rendered on an electronic device. The content stream may be generated by an external source, such as a television station broadcast tower, or by an integrated source, such as a software driver for a storage medium. The content stream may be stored in a storage medium, such as a hard drive or optical storage medium.

As used herein, the term "render" and its grammatical equivalents means to play, display, interpret, decode, show, reproduce, or otherwise present the information in the content stream in a manner that can be perceived by a user. Typically, the information in the content stream is rendered using a display, monitor, or screen in combination with speakers.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software code operating on a microprocessor, sometimes referred to as computer readable instructions, for execution by various types of processors. An identified module of executable code operating on a microprocessor may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction operating on a single microprocessor, or many instructions operating on a single computer or on multiple microprocessor, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Turning now to the present disclosure, applicant has discovered an apparatus and method for creating an integrated and synchronized advertisement and content delivery system. The present disclosure may manage multiple phases of an advertising campaign through the delivery of targeted advertisements across multiple platforms. The present disclosure is able to discriminate amongst various users of an electronic device through identification techniques, such as biometric recognition techniques and non-biometric recognition techniques. Once the identification of a user is positively confirmed, the present disclosure may monitor a content stream being delivered to the electronic device for an advertisement placement opportunity. Once an advertisement placement opportunity has been identified, a targeted advertisement, selected in accordance with the user's profile, is rendered to the user according to an advertisement placement opportunity.

After rendering of the targeted advertisement, the present disclosure may report the rendering of the targeted advertisement to a centralized management system by sending an electronic notification over a network. The receipt of the electronic notification may automatically trigger the implementation of another phase of the advertising campaign. Further, the present disclosure may provide for revenue sharing with the providers and/or owners of a content stream into which a targeted advertisement is rendered.

Referring now to FIG. 1, there is shown a diagram of an exemplary embodiment of a system 100 in accordance with the principles of the present disclosure. An electronic device 102 is able to render a content stream to a user. In one embodiment the electronic device 102 is a television. In another embodiment the electronic device is a cell phone 102. In still another embodiment the electronic device 102 is a computer. In yet still another embodiment, the electronic device 102 is a portable handheld device, such as a digital music player (iPod, mp3 player, etc.). Thus, it will be understood that the electronic device 102 is any electronic device that is able to render, either visually, audibly or otherwise, a content stream, to a user.

A content source 104 may provide the content stream to the electronic device 102 over a communication path 106. The communication path 106 between the content source 104 and the electronic device 102 may comprise a wireless communication path, a wired communication path, or a combination of both. The content source 104 may be located remotely from the electrical device 102. Alternatively, the content source 104 may be located proximate the electronic device 102 or even integrated into the electronic device 102.

The content source 104 may be include, without limitation, a television station network, a communications satellite, a cable TV station, a gaming system, a web server, a cellular phone network, electronic memory, a computer server, a music player, a computer, a DVD player, a Blu-Ray disc player, an HD DVD player, a high definition optical player, a CD player, a VCR player, a tape recorder, personal video recorder ("PVR"), an IPTV station, and any other similar and equivalent devices that transmit content streams for rendering to electronic devices. It should therefore be understood that the content source 104 includes any device, apparatus, system or network capable of generating the content stream.

As mentioned, the content stream may be delivered to the electronic device 102 from the content source 104 over the communication path 106. If the communication path 106 is a wireless communication path, it may utilize a radio frequency communication scheme such as those commonly used for broadcast television, satellite TV, radio stations, pager networks, and cellular telephones. If the communication path 106 is a wired communication path, it may include cable TV networks, fiber optic networks, power line networks, telephone lines, twisted pair, CAT-5, RCA cables, coaxial cables, or any other type of conductor or light transmission device used to carry information. In short, it should be recognized that there is no limitation on the medium through which the content stream is delivered to the electronic device 102 from the content source 104.

Further, it should be noted that the content stream may originate from information stored in a variety of storage mediums, including both electronic storage mediums and optical storage mediums. For example, if the content source 104 is a gaming system, the content stream may be generated from information stored on a CD, DVD, Blu-Ray disc, or an HD DVD disk. If the content source 104 is a web server, the content stream may be generated from information stored electronically on a storage medium accessible by the web server.

The content stream provided by the content source 104 may be provided on-demand or pursuant to a fixed broadcast schedule. For example, in the case where the content source 104 is a web server, the content stream may be provided when requested by the electronic device 102. If the content source 104 is a television or a radio network, the content stream may be broadcast constantly pursuant to a fixed broadcast schedule. If the content source 104 is a gaming system, the content stream may only be provided when the gaming system is turned on and the appropriate game disk is installed into the gaming system.

Likewise, the content source 104 may provide the content stream in any one of a wide variety of formats. The only restriction on the formatting of the content stream is that it must be compatible for rending on the electronic device 102. Suitable formats for the content stream include all audio, video, media, proprietary, and other formats now known or known in the future. Suitable formats, include, without limitation, NTSC, HTML, DTV, AVI, Windows Media, MPEG-1, MPEG-2, MPEG-4, QuickTime, RealVideo, Flash and Shockwave. Other suitable formats include audio formats such as AAC, AC3, MID1, MP3, RealAudio, Waveform, and WMA. Other suitable formats include image formats such as BMP, GIF, JPG, JPG 2000, MNG, PNG, SVG, TIFF. Other suitable formats include ASCII, DOC, EBCDIC, HTML, OEBPS, RTF, Unicode, WPD, and XML. Still other suitable formats include the CD, DVD, Blue-Ray, and HD DVD formats. Further, it will be noted that the content stream may be first received at an intermediary device, such as a decoder, router, gateway, satellite receiver, a cable receiver, or a high definition receiver, and then delivered to the electronic device 102.

The content stream provided by the content source 104 typically comprises a combination of both programming and advertising. The content stream may, however, only comprise programming with no advertising. Examples of programming may include television shows, music, or other information. The term "advertising" refers generally to a paid promotion for goods, services, companies and ideas by a sponsor.

In addition to receiving the content stream from the content source 104, the electronic device 102 may transmit and receive communications from a centralized management system 110 over a communication path 108. The centralized management system 110 may be located at a remote location, thereby requiring that the communication path 108 comprise a communications network. Suitable networks for the communication path 108 may include, without limitation, a computer network such as a local area network ("LAN") or a wide area network ("WAN"). In one exemplary embodiment, the network used by the communication path 108 is a packet-switched network such as the Internet.

The communication path 108 between the centralized management system 110 and the electronic device 102 may be direct or in-direct. Further, the communication path 108 may use any one of a wide variety of transmission mediums, including a wireless communication path, a wired communication path, or a combination of both. The electronic device 102 and the centralized management system 110 may use an appropriate communications protocol to communicate with each other as is known by one having ordinary skill in the art.

The centralized management system 110 may include a storage medium having targeted advertisements stored therein. In a manner that will be described in more detail hereinafter, the centralized management system 110 may transmit targeted advertisements to a local storage medium associated with the electronic device 102. Each targeted advertisement may be linked to a known user of the electronic device 102. The electronic device 102 may then access the targeted advertisements and render them to a specified or targeted user of the electronic device 102 as specified in the link. The targeted advertisements may be rendered to a targeted user in accordance with advertisement placement opportunities in the content stream from the content source 104. In one embodiment, the targeted advertisements displace advertising in the content stream.

In addition to the targeted advertisements, the centralized management system 110 may further provide a subscription-based content stream to the electronic device 102 over the communication path 108. The subscription-based content stream may be stored locally at the electronic device 102 in a storage medium for rendering on-demand at a later time.

The subscription-based content stream may include customized programming selected by a user of the electronic device 102. The user may request the subscription-based content stream in a variety of manners. In one embodiment, a user may simply select the desired programming through a user interface of the electronic device 102. The user interface may be a graphical user interface. For example, the graphical user interface may list all of the programming available from the centralized management system 110. The programming may include television programs, movies, news, music and sporting events. The subscription-based content streams may also include subject matter based content. That is, a user may elect to receive programming related to a particular topic. For example, the user may select to receive programming related to a particular sports team, actor, hobby, or event. The centralized management system 110 would then deliver the programming selected by the user in a content stream.

The subscription-based content stream may be rendered in real-time on the electronic device 102. Alternatively, the subscription-based content stream is stored at the electronic device 102 for later rendering at a convenient to the user. Control over the rendering of the subscription-based content stream may be done through a user interface associated with the electrical device 102.

It will be appreciated that the subscription-based content stream allows the delivery of programming that may otherwise be unavailable. For example, a user may desire to receive a news broadcast from a television station that does not broadcast in the geographical area where the user resides. The subscription-based content stream delivered from the centralized management system 110 allows the user to receive the news broadcast. Further, the user is able to view the news broadcast at his or her leisure thereby freeing the content stream from a fixed broadcast schedule. Further, it will be appreciated that the ability of the centralized management system 110 to deliver the content stream directly to the electronic device 102 allows the user to select only the programming that the user desires.

In one embodiment, the user may select to receive television shows from multiple different channels. These television shows are delivered in the subscription-based content stream from the centralized management system 110 to the electronic device 102. The user may then view the television shows as if they were all broadcast on a single channel. In this sense, the user is able to watch a "virtual channel" of programming selected by the user. Thus, it will be appreciated that the user can select to receive sporting events, movies, television shows, news broadcasts, music, talk radio shows, or any other programming available from the centralized management system 110.

The centralized management system 110 is not be limited to any one content source and could offer content from a wide variety of content sources, including television networks, movie studios, radio stations, and even independent content sources. In one embodiment, the centralized management system 110 may allow a user to select to receive programming in a native language of the user that would otherwise be unavailable. Further, the subscription-based content stream may be provided to the centralized management system 110 by an outside content source 120 over a communication path 122. It will be appreciated that the centralized management system 110 may receive the subscription-based content stream from a multiple outside content sources, including content source 104. Thus, the present disclosure uniquely allows programming that would not otherwise merit a dedicated "channel" to be delivered to the electronic device 102.

The present disclosure also allows for advertisements to be placed in relation to the subscription-based content streams. In one embodiment, advertisements may be placed into the subscription-based content streams at the centralized management system 110. The subscription-based content streams are then transmitted to the electronic device 102 together. In another embodiment, the advertisements may be placed into the subscription based content streams at the electronic device 102. Thus, in this embodiment, the subscription-based content stream and the advertisements may be separately transmitted to the electronic device 102 by the centralized management system 110.

The advertisements placed into the subscription-based content stream may be targeted to a specific user of the electronic device 102. Alternatively, the advertisements may be placed into the subscription-based content stream based upon some other criteria, or even no criteria at all. Thus, if a user selects to receive specific content stream, e.g., a television show, from the centralized management system 110, the content stream would be rendered at the electronic device 102 with the advertisements added at the centralized management system 110 or at the electronic device 102.

The electronic device 102 may report feedback to the centralized management system 110 over the communication path 108. The feedback may include an electronic notification reporting that one or more targeted advertisements transmitted by the centralized management system 110 to the electronic device 102 has in fact been rendered to the targeted user. This feedback may allow the centralized management system 110 to track the delivery of the targeted advertisements. In addition, the feedback may include information on the content stream into which the targeted advertisement was placed. This information may be utilized by the centralized management system 110 to identify a provider of the content stream. As will be explained in more detail hereinafter, the provider of the content stream may share any advertising revenues generated from the placement of the targeted advertisement.

At least one user of the electronic device 102 may be required to complete an enrollment process with the centralized management system 110. Alternatively, all the users of the electronic device 102 may be required to enroll with the centralized management system 110. For example, all of the members of a household may be required to enroll with the centralized management system 110.

The enrollment process may be completed through a wide variety of methods, including through the electronic device 102, another electronic device, live interview, or through a paper form. A graphical user interface, such as an interactive web page, may be employed to assist in the enrollment process. In one embodiment, the enrollment process may require that a user complete a profile assessment by providing information in response to survey-type questions.

The profile assessment may gather information regarding the age of the user, the sex of the user, the income of the user, the marital and family status of the user, the race of the user, the residence of the user, the native language of the user, the credit rating of the user, the hobbies of the user, the general and specific interests of the user, and/or any other information deemed necessary to direct targeted advertisements to the user.

In addition, during the enrollment process, the user may elect not to receive advertisements for certain products or services. For example, the user may elect not to receive alcohol or cigarette related advertisements during the enrollment process. The enrollment process may take place on-line, through a personal interview, or any other similarly related methodologies. The profile information gathered from a user may be stored in a database associated with the centralized management system 110. In addition, the enrollment process may require the user to submit a biometric or non-biometric reference sample to be used in identifying the user.

Targeted advertisements may be supplied to the centralized management system 110 from an advertising source 112. The advertising source 112 may be operated by a third-party, such as an advertising agency or by a marketing department of a company. The advertising source 112 and the centralized management system 110 may engage in communications over a communication path 114.

Through the communication path 114, the advertising source 112 may transmit the targeted advertisements to the centralized management system 110. The targeted advertisements may be provided by the advertisement source 112 in a format suitable for transmission to the electronic device 102 by the centralized management system 110. Alternatively, the centralized management system 110 may have the capability to format or re-format a targeted advertisement for transmission to the electronic device 102. Further, the targeted advertisements may be provided to the centralized management system 110 on a portable storage medium, such as a CD or DVD.

In addition to the targeted advertisements, the advertisement source 112 may provide target profiles associated with the targeted advertisements. The target profiles may identify a specific profile of a user to whom the targeted advertisements are directed. The target profiles may be developed by using profile information, which may contain demographic and behavioral information, stored at the centralized management system 110.

Once a targeted advertisement and its associated target profile have been received at the centralized management system 110, the centralized management system 110 may compare the target profile to the profiles of all of the enrolled users to determine a group of targeted users to whom the targeted advertisement should be delivered. It will be appreciated by those having ordinary skill in the art that the profiles of the targeted users may be only a close match to the target profile and that an exact match is not required between the target profile and a user's profile. In one embodiment, there is a 90% or higher match between the target profile and a user's profile in order for the user to be targeted. In another embodiment, there is an 80% or higher match between the target profile and a user's profile in order for the user to be targeted. In still another embodiment, there is an 70% or higher match between the target profile and a user's profile in order for the user to be targeted.

In one embodiment of the present disclosure, if a user of the electronic device 102 is found to have a profile that corresponds to a target profile for a targeted advertisement, the centralized management system 110 may deliver the targeted advertisement to the electronic device 102 via the communication path 108. In another embodiment, if a user of the electronic device 102 is found to have a profile that corresponds to the target profile for the targeted advertisements, the centralized management system 110 may deliver the targeted advertisements to the electronic device 102 along with a subscription-based content stream via the communication path 108.

The targeted advertisements, and, if transmitted, the subscription-based content stream, may be stored in a storage medium locally associated with the electronic device 102. When it is confirmed that the targeted user is actually using the electronic device 102, the electronic device 102 may render the targeted advertisement to the user at the first available opportunity or some at other specified opportunity. The confirmation that the targeted user is actually using the electronic device 102 may be accomplished through a biometric or non-biometric recognition technique using the reference sample submitted by the user during the enrollment process.

The rendering of the targeted advertisement to a targeted user may be accomplished in several ways. In one embodiment, upon verification that a targeted user is actually using the electronic device 102, the electronic device 102 may begin monitoring the content stream from the content source 104 or the subscription based content stream from the centralized management system 110 for advertisement placement opportunities. When an advertisement placement opportunity is identified, the electronic device 102 will render the targeted advertisement in accordance with the advertisement placement opportunity.

Further, the electronic device 102, either separately or in combination with the centralized management system 110, may also identify the owner or provider of the content stream or subscription-based content stream into which the targeted advertisement is placed. This information may be stored for later transmission to the centralized management system 110. Alternatively, the electronic device 102 may gather data regarding the content stream into which a targeted advertisement has been placed such that the data may be used to identify the owner or provider of the content stream. Thus, included in the communications 108 from the electronic device 102 to the centralized management system 110 may be information regarding the content stream into which the targeted advertisement is placed. Further, as previously mentioned, the electronic device 102 may send an electronic notification reporting that one or more of the targeted advertisements previously transmitted to the electronic device 102 by the centralized management system 110 has in fact been rendered to the targeted user. To the extent not previously provided, the centralized management system 110 may determine the content owner or content provider associated with the content stream from information received from the electronic device 102 over communication path 108.

The centralized management system 110 may send communications over a communication path 116 to a third-party system 118 operated by a content owner or content provider associated with the content stream from the content source 104. This information may include a report regarding the placement of the targeted advertisement into the content stream. The report may also include information on the sharing of any advertisement revenues generated by the advertisement placement as will be explained hereinafter.

In addition, the communications between the centralized management system 110 and the advertisement source 112 may include a report regarding the placement of the targeted advertisement. Likewise, the communications between the centralized management system 110 and the content source 120 may include a report regarding the placement of the targeted advertisement.

Although only one advertisement source 112 is depicted in FIG. 1, it will be appreciated by those having ordinary skill in the art that the centralized management system 110 may receive targeted advertisements from multiple advertisement sources. In this manner, the centralized management system 110 is able to deliver targeted advertisements from multiple advertisement sources. Further, it will be appreciated by those having ordinary skill in the art, that multiple users may enroll with the centralized management system 110 for the electronic device 102.

Moreover, although only one electronic device 102 is depicted in FIG. 1, it will be appreciated by those having ordinary skill in the art that multiple electronic devices, each having one or more users, may receive targeted advertisements from the centralized management system 110. In this manner, the centralized management system 110 is able to deliver targeted advertisements across multiple platforms to multiple users as will be explained in greater detail hereinafter.

Figure 2:
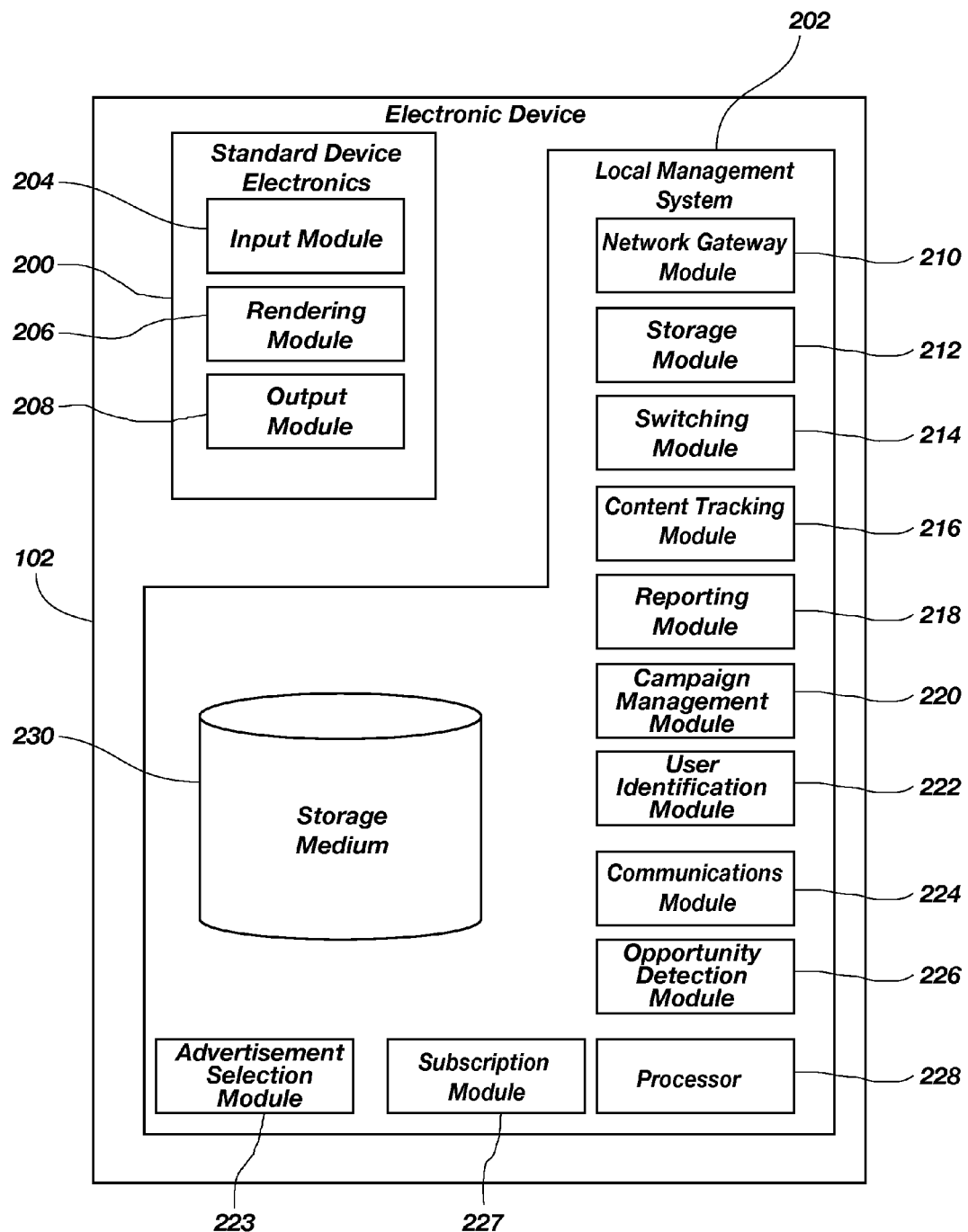
FIG. 2 is a diagram illustrating an exemplary embodiment of the electrical device illustrated in FIG. 1.

Referring now to FIG. 2, there is illustrated a diagram of the logical and other components of an exemplary electronic device 102. As previously mentioned, the present disclosure is not limited to any particular type of electronic device 102 and may include, without limitation, televisions, cellular phones, computers, personal digital assistants and portable music players. Thus, it is to be understood by those having ordinary skill in the art that the features disclosed in relation to FIG. 2 may be incorporated into a wide range of electronic devices having the ability to render a content stream.

The electronic device 102 may include standard device electronics 200 and a local management system 202. The standard device electronics 200 are those components typically associated with that type of electronic device 102. For example, if the electronic device 102 is a television, then the standard device electronics 200 are those components found in a conventional television. Likewise, if the electronic device 102 is a computer, then the standard device electronics 200 are those components found in a conventional computer. Additionally, if the electronic device 102 is a cellular phone, then the standard device electronics 200 are those components found in a cellular phone.

At a minimum, the standard device electronics 200 may include an input module 204, a rendering module 206, and an output module 208. In other words, typically common to all of the various forms that the electronic device 102 may take, the standard device electronics 200 may include the input module 204, the rendering module 206 and the output module 208.

The input module 204 is operable to receive a signal containing the content stream and contains all the necessary circuitry to accomplish this task. For example, if the content stream is received via a wireless connection, the input module 204 may include an antenna and associated radio frequency circuitry necessary to receive the signal. Likewise, if the content stream is received via a wired connection, the input module 204 may include the appropriate connection jacks and the necessary circuitry to accomplish this task. The input module 204 may include a modem, a network card, or any other circuitry necessary to receive the content stream.

The rendering module 206 is operable to receive the content stream and provide it to the output module 208 in the appropriate format. The output module 208 may comprise an electronic display, screen, monitor, and/or speakers. The output module 208 allows a user to perceive the content stream.

The local management system 202 includes various components as will now be described. A network gateway module 210 is operable to allow communications between the electronic device 202 and the centralized management system 110. The network gateway module 210 may comprise a connection to a LAN or a WAN. In one exemplary embodiment, the network gateway module 210 allows communications to be received and transmitted over a network such as the Internet. In particular, the network gateway module 210 facilitates the communications with the centralized management system 110 over the communication path 108. The targeted advertisements, subscription-based content stream, and the feedback are all sent and received through the network gateway module 210. In the appropriate circumstances, the network gateway module 210 and the input module 204 may share components.

The storage module 212 is operable to control storage of information in a storage medium 230 and may include the appropriate software drivers. The information stored on the storage medium 230 may include the targeted advertisements, subscription-based content streams, computer software for the other modules, as well as any other needed information or programming required to accomplish the tasks described herein. The storage module 212 may also control buffering of the targeted advertisements and/or subscription-based content streams to thereby prevent a buffer underrun.

A switching module 214 is operable to cause that the targeted advertisements received from the centralized management system 110 are rendered on the electronic device 102 according to the advertisement placement opportunities. In one embodiment, the switching module 214 may comprise a switch capable of switching between the content stream from the content source 104 and the targeted advertisements stored on the storage medium 230. Thus, the switching module 214 may switch the source for the rendering module 206 between the content stream from the content source 104 and the targeted advertisements.

A content tracking module 216 tracks and records information regarding the content stream into which the targeted advertisements are placed. In one embodiment, the content tracking module 216 may extract and record embedded codes in the content stream from the content source 104. These embedded codes may then be transmitted to centralized management system 110 where the content provider and/or content owner of the content stream from the content source 104 may be identified using the codes. In another embodiment, the content tracking module 216 may also simply track and record the time and the specific channel that carries the content stream. This information may then be transmitted to the centralized management system 110 where the content provider and/or content owner may be identified.

In another embodiment, the content tracking module 216 may record the internet address of a website into which the targeted advertisements are placed. This information is then transmitted to the centralized management system 216. In another embodiment, the content tracking module 216 may also create a map of the data in the content stream. The map of the data may then be transmitted to the centralized management system 110 where the content provider and/or content owner are identified using the data map. It will be appreciated by those having ordinary skill in the art that any process or methodology now known or known in the future that is used to identify the owner or provider of the content stream falls within the scope of the present disclosure.

A reporting module 216 generates the feedback and other information transmitted to the centralized management system 110. The feedback may include information verifying the rendering of the targeted advertising to the targeted user.

A campaign management module 220 insures that the targeted advertisements are rendered according to any delivery requirements sent by the centralized management system 110. For example, the delivery requirements may set the sequence in which the targeted advertisements are rendered to a user. The delivery requirements may also specify where in the content stream that the targeted advertisements should be placed.

A user identification module 222 is operable to identify the user of the electronic device 102. The user identification module 222 may include integrated technologies that passively identify the user of the electronic device 102. As used herein, the term "passively" means that a user is not actively aware of the operation of the user identification module or that the electronic device does not require specific user input to trigger the delivery of the targeted advertisements.

In one embodiment, the user identification module 222 utilizes biometric recognition technologies and techniques. Suitable biometric recognition technology includes fingerprint recognition, retina recognition, heartbeat recognition, voice recognition, face recognition, and any other technology now known or known in the future that utilizes a measurable, physical characteristic or personal behavioral trait that may be used to recognize the identity, or verify the claimed identity, of a user. Other passive identification options for non-biometric technologies and techniques include associating a specific user with a cellular phone number, a serial number of an electronic device, or IP address assigned to an electronic device. The user identification module 222 may then identify a user based on the proximity of a known user mobile device associated with a specific cellular phone number, serial number, or IP address. The user identification module 222 may also use active identification technologies such as passwords, logins, and challenge questions to identify the user.

In the case where the user identification module 222 employs a biometric recognition technology, enrollment by the user may be required. That is, a user may be required to submit a reference sample of the characteristic or trait used to identify the user. Once taken, the reference sample may be stored at the centralized management system 110. The reference sample may be disseminated to the electronic device 102 associated with the user through the communication path 108. It will be appreciated that the reference sample for a user may be disseminated to multiple electronic devices 102 such that the user may only have to provide the sample one time.

The user identification module 222 may include the necessary components to capture the user's characteristic or trait. For example, in the case where the biometric technology utilizes finger print recognition, the user identification module 222 may include a fingerprint scanner. Once the user's fingerprint is scanned, the scan is compared to the reference sample to thereby identify the user.

Once the user's identity is confirmed, or, stated another way, the user of the electronic device is confirmed to have previously enrolled with the centralized management system, an advertisement selection module 223 determines if any targeted advertisements on the storage medium are linked to that user. If a targeted advertisement is linked to the current user of the electronic device, then the advertisement selection module 223 may then notify the switching module 214 and the opportunity detection module 226 of a targeted advertisement that needs placement.

A communications module 224 is operable to control communications between the electronic device 102 and the centralized management system 110. The communications module 224 may include the necessary components and protocol to ensure reliable communications.

The opportunity detection module 226 may be operable to recognize advertisement placement opportunities in the content stream or the subscription-based content stream. For example, the opportunity detection module 226 may identify an advertising slot. In one embodiment, in order to identify an advertisement placement opportunity, the opportunity detection module 226 may monitor the content stream for embedded codes that signal an upcoming slot designated for advertising. The embedded codes may take the form of an inaudible tone or any other type of signaling or flag. Once an upcoming slot designated for advertising has been identified, the opportunity detection module 226 may cause that the original advertisements in the content stream be displaced by the targeted advertisements using the switching module 214.

A subscription module 227 may manage the subscription-based content stream from the centralized management system 110. The subscription module 227 may be operable to generate a graphical user interface to allow a user to select content or programming available from the centralized management system 110. In this regard, the centralized management system 110 may transmit to the electronic device 102 over the communication path 108 a list of all available content and programming.

The local management system 202 may include a microprocessor 228, also known as a centralized processing unit. As the various modules 210-227 may include computer programming code, the modules 210-227 may utilize the microprocessor 228 to accomplish their intended purposes as outlined herein.

It will be appreciated that the local management system 202 may be integrated into the electronic device 102 or may be contained in a separate and stand alone unit having a connection to the electronic device 102. It will further be noted that any of the modules 210-227 may also be integrated into the electronic device 102, or any or all of them may be externally located with respect to the electronic device 102. Further, omissions of any of the modules 210-227 in an electronic device 102 still falls within the scope of the present disclosure. That is, alternative embodiments of the present disclosure may have less than all of the modules 210-227 shown in FIG. 2. Further, the modules 210-227 may share common resources without departing from the scope of the present disclosure.

Figure 3:
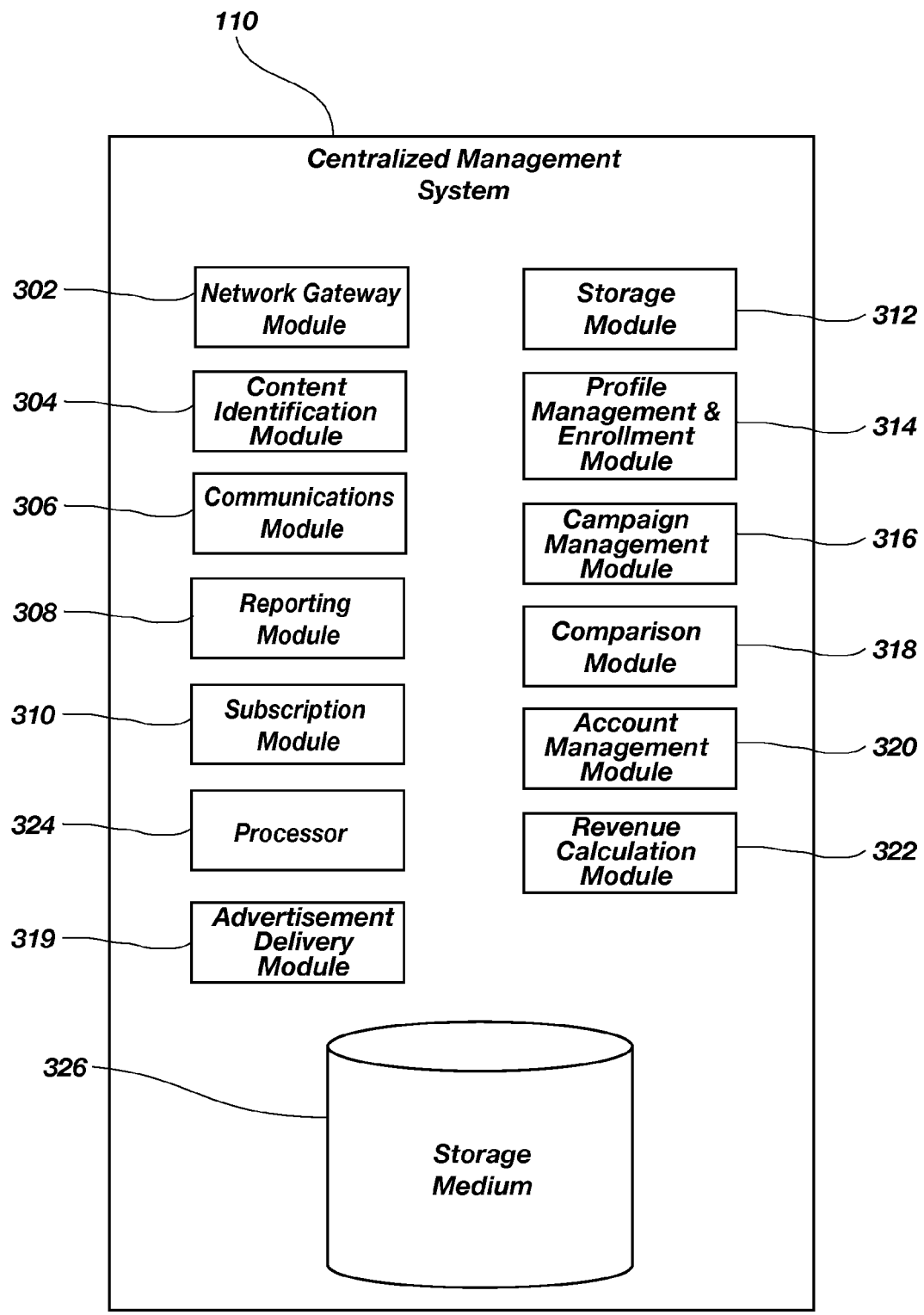
FIG. 3 is a diagram illustrating an exemplary embodiment of the centralized management system illustrated in FIG. 1.

Referring now to FIG. 3, there is illustrated a diagram of the logical and other components of an exemplary centralized management system 110. As mentioned above, the centralized management system 110 may be remotely located from the electronic device 102 such that the centralized management system 110 is able to communicate with multiple electronic devices. Each of the various components of the centralized management system 110 will now be described.

A network gateway module 302 is operable to allow communications between the electronic device 102 and the centralized management system 110. The network gateway module 302 may comprise a connection to a network, such as a LAN or a WAN. In one exemplary embodiment, the network gateway module 302 allows communications to be received and transmitted over a network such as the Internet. The network gateway module 302 may also allow communications with the advertisement source 112 and the third-party system 118.

A content identification module 304 is operable to identify the content provider and/or the content owner of the content stream. The content identification module 304 may use information gathered by the electronic device 102 and transmitted to the centralized management system 110 in order to identify the content provider and/or content owner of the content stream. The content identification module 304 may identify the content provider and/or content owner of the content stream using any one of a variety of methods described above.

In one embodiment, a content provider and/or content owner of the content stream may be identified using codes embedded in the content stream. The embedded codes may be extracted from the content stream by the electronic device 102. Once extracted, the codes may then be transmitted to the centralized management system 110 using communications 108. The content identification module 304 may then use the codes to properly identify the content provider and/or content owner. In another embodiment, the content identification module 304 may utilize a data point map extracted from the content stream and transmitted to the centralized management system 110 by the electronic device 102. The content identification module 304 may then compare this map to known maps to identify the content owner and/or content provider. In another embodiment, the electronic device 102 may log the time and channel on which the content stream is broadcast and transmit this information to the centralized management system 110. The content identification module 304 may then compare this information to a programming schedule to identify the content owner and/or content provider.

A communications module 306 is operable to control communications between the electronic device 102 and the centralized management system 110, the centralized management system 110 and the advertisement source 112, and the centralized management system 110 and the third-party system 118. For example, the communications module 306 may identify optimal communication times to download the targeted advertisements to the electronic device 102. The communication module 306 may track successful and unsuccessful communications and repeat as necessary. The communication module 306 may be completely autonomous from human interaction such that the communications with the electronic device 102 occur automatically.

A reporting module 308 may be operable to generate reports regarding the targeted advertisement placing and any revenue sharing with content providers. The reports may be generated automatically pursuant to a reporting policy established by the operators of the centralized management system 110. The reports generated by the reporting module 308 may include information received from the reporting module 218 on the electronic device 102. The reports 308 may be disseminated to the advertisement source 112 and the third-party system 118.

A subscription module 310 is operable to provide a subscription-based content stream having customized content to the electronic device 102. For example, as explained previously, a user of the electronic device 102 is able to select programming and other content for delivery to the electronic device 102 from the centralized management system 110. Targeted advertisements may be placed into the subscription-based content stream at the centralized management system 110 prior to transmission to the electronic device 102. This may be done on-the-fly as the subscription-based content stream is transmitted. Alternatively, the subscription-based content stream may be transmitted separately from the targeted advertisements.

Thus, the subscription module 310 that is operable to allow a user to subscribe to any content stream available from the centralized management system 110. As mentioned, the content stream may be provided by an outside content source 120 over the communication path 122 to the centralized management system 110. It is contemplated that the present disclosure includes receiving content streams from multiple content sources.

The subscription module 310 may provide a list of all available content streams to the electronic device 102 to thereby facilitate user selection at the electronic device 102. The subscription module 310 may provide navigable menu screens to the electronic device 102 such that the user may select from available programming. For example, the screens may include all available movies, shows, programming or other content available for delivery to the electronic device 102 through the centralized management system 110.

The centralized management system 110 may include a storage module 312 that is operable to manage and control the storage of information in a storage medium 326. The storage module 312 may include a database management application suitable for the purposes outlined herein. The storage module 312 may include the appropriate software drivers for accessing information from the storage medium 326.

The centralized management system 110 may include a user profile management and enrollment module 314 that is operable to receive and manage user profiles in the storage medium 326. A user profile may include information regarding a user of the electronic device 102. The user profile management and enrollment module 314 may administer an on-line profile assessment to a user thereby enroll a user with the centralized management system 110. The user profile management and enrollment module 314 may also receive and store biometric reference samples from users as part of the users profile. In addition, the user profile management and enrollment module 314 may also associate all of the electrical devices of a user with the user's profile.

The centralized management system 110 may include a campaign management module 316 that is operable to manage and control an advertising campaign and to set any delivery requirements for the targeted advertisements. An advertising campaign may include various phases. Each phase may include the delivery of an advertisement using a different platform. Using the feedback from the electronic device 102, the campaign management module 316 is able to cause subsequent phases of an advertising campaign to be performed on a different platform or the same platform in a sequential manner.

The centralized management system 110 may include a comparison module 318 that is operable to compare the target profiles for the targeted advertisements to the user profiles to thereby determine a group of targeted users. At this point, the centralized management system 110 may generate feedback to the advertisement source 112 regarding the group of targeted users. This feedback may include the information regarding the number of users in the group of targeted users. This information may allow the modification of the target profile such that the size of the group of targeted users may be increased or decreased. This process may undergo several iterations until a desired group of targeted user profiles has been generated.

Once the targeted users have been identified and finalized by the comparison module 318, the centralized management system 110 may transmit the targeted advertisements to an electronic device 102 associated with each of the targeted users via the advertisement delivery module 319. The advertisement delivery module 319 may also transmit a link associated with a targeted advertisement. The link may identify the targeted user to whom the targeted advertisement is directed. In this manner, the electronic device 102 may utilize the link to ensure proper delivery of the targeted advertisement to the targeted user.

It should be noted that users who do not have a matching profile to the targeted profile may not receive the targeted advertisements. The delivery of the targeted advertisements to the electronic devices 102 of the targeted users may take place as the system demands allow. Typically, this may occur during off-peak hours. Further, the process may occur over several hours, days or weeks depending upon the size of the group of targeted users.

An account management module 320 is operable to establish and manage accounts for content providers and advertisement providers. The account management module may establish a revenue account for the content providers. The revenue accounts of each of the content providers may be updated to reflect the content providers share of any advertising revenues generated from the placement of the targeted advertisements in relation to a content stream associated with the content providers. The content providers may provide the content streams directly to the centralized management system through content source 120 or to directly to the electronic device 102 through content source 104. Thus, the present disclosure is able to compensate content providers for the placement of targeted advertisements in content streams from the content source 104 or subscription-based content streams from the centralized management system 110.

A revenue calculation module 322 may be operable to calculate any revenue sharing of any compensation received for placing the targeted advertisements. Compensation for placing the targeted advertisement may be received from the operators of the advertising source 112, which may include advertising agencies or companies. It will be appreciated that because the present disclosure is able in most cases to identify the content provider of the content stream into which the targeted advertisements are placed, that the operators of the centralized management system 110 are able to share revenues with the content provider of the content stream.

Further, the revenue calculation module 322 may generate a report that is transmitted to the third-party system 118, which may be operated by the content providers of the content stream. The revenue calculation module 322 calculates the revenue sharing based upon the particular content stream into which a targeted advertisement is placed. For example, if the electronic device 102 is a television tuned to a broadcast television station showing a movie, the electronic device 102 may insert a targeted advertisement into the movie during a regularly scheduled commercial break. The electronic device 102 may record the time that the targeted advertisement was placed and the channel showing the movie. This information may be transmitted back to the centralized management system 110. Using this information, the centralized management system 110 may then identify the content provider, i.e., the broadcast television station, and the content owner, i.e., the owner of the movie being broadcast (such as a movie studio). The revenue calculation module 322 may then calculate shares of the compensation received from an advertising agency to place the targeted advertisement among the operators of the centralized management system 110, and the content owner, and content provider. This model may require that the operators of the centralized management system 110 establish revenue sharing agreements with the content providers to determine the amount of the revenue share. As used herein, the term "content provider" shall be construed to also include content owners.

The centralized management system 110 may include a microprocessor 324, also known as a central processing unit, that is operable to process any of the required data from any of the modules 302-322. The processor 324 may take any one of a variety of forms including a single processor or multiple processors. Further, it will be appreciated that the centralized management system 110 may be integrated into a single computing device or may be distributed across multiple computing platforms. It will further be noted that the modules 302-322 may also be integrated into a single computing device or may be separately located amongst multiple computing platforms. Further, omission of any of the modules 302-322 falls within the scope of the present disclosure. That is, alternative embodiments of the present disclosure may have less than all of the modules 302-322 shown in FIG. 3.

Figure 4:
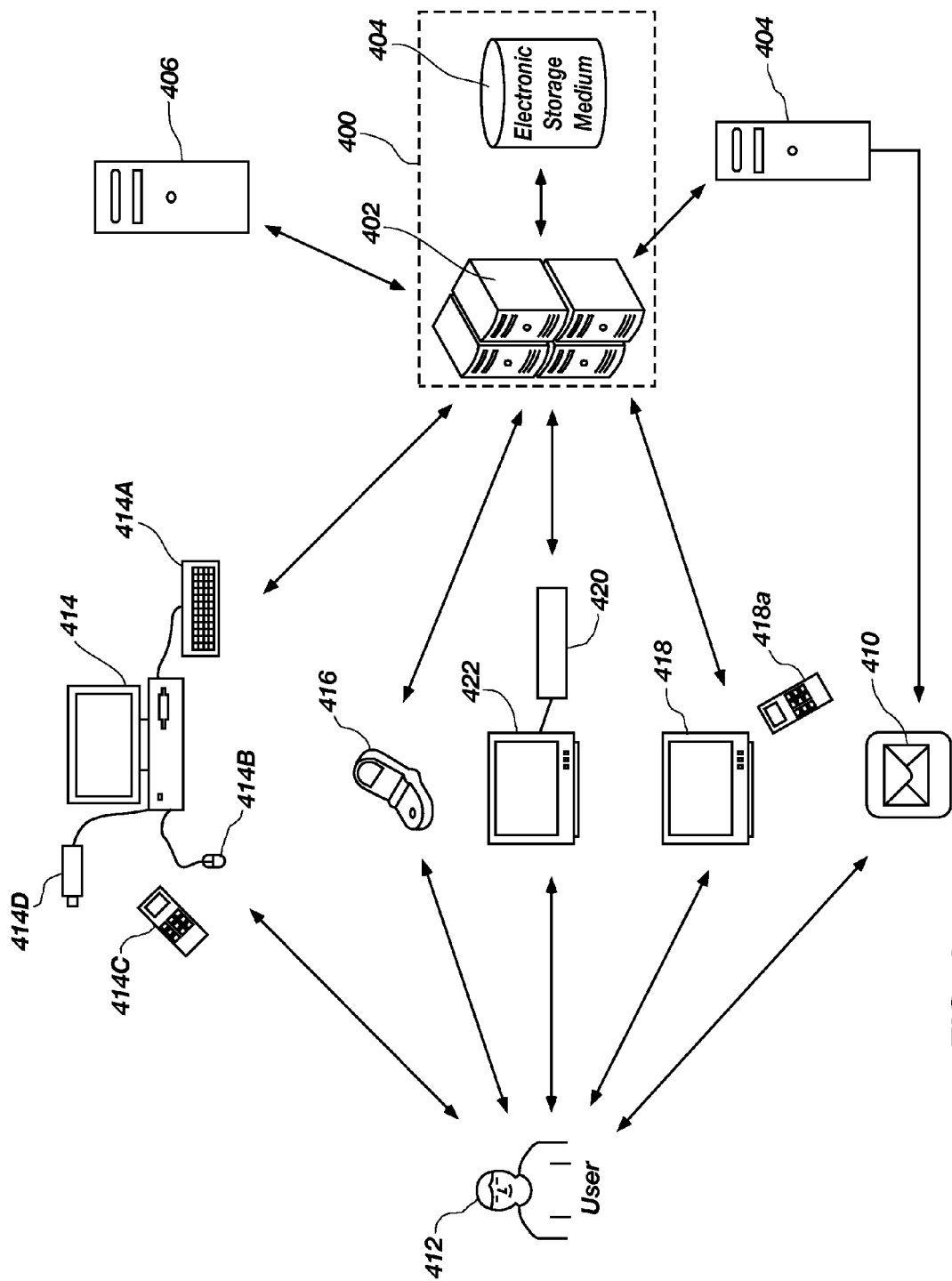
FIG. 4 is a diagram illustrating another embodiment of a system pursuant to the present disclosure.

Referring now to FIG. 4, there is shown another exemplary embodiment of the present disclosure. A centralized management system 400 may comprise one or more computing devices 402 in communication with an electronic storage medium 404. The centralized management system 400 may receive targeted advertisements in an electronic format from a computing device 406. The computing device 406 and the centralized management system 400 may communicate over a computer network, such as the Internet. The computing device 406 may be operated by advertisers or advertising agencies. When received at the centralized management system 400, the targeted advertisements are electronically stored in the electronic storage medium 404.

It should be noted that the targeted advertisements may stored in any format suitable for rendering on an electronic device. For example, suitable formats for the targeted advertisements include AVI, Windows Media, MPEG-1, MPEG-2, MPEG-4, QuickTime, RealVideo, Flash and Shockwave. Other suitable formats include audio formats such as AAC, AC3, MID1, MP3, RealAudio, Waveform, and WMA. Other suitable formats include image formats such as BMP, GIF, JPG, JPG 2000, MNG, PNG, SVG, TIFF. Other suitable formats include ASCII, DOC, EBCDIC, HTML, OEBPS, RTF, Unicode, WPD, and XML. Still other suitable formats include DVD, Blue-Ray, and HD DVD.

The computing device 406 may also transmit target profile to the centralized management system 400 in association with the targeted advertisements. The target profile may specify a specific profile of the intended recipients of the targeted advertisements. The centralized management system 400 compares the target profile to user profiles stored on the electronic storage medium 404 using a computer application running on computing devices 402. The comparison of the target profile to the user profiles results in a list of targeted users for the targeted advertisements. Thus, it will be understood that the targeted users have a profile that matches or is close to the targeted profile. This list of targeted users may be stored on the electronic storage medium 404.

The targeted advertisements may include individual advertisements intended to be rendered on different platforms. For example, the targeted advertisements may include an advertisement in a format suitable for rendering on a television, an advertisement in a format suitable for rendering on a computer, and an advertisement in a format suitable for rendering on a cellular phone. The centralized management system 400 is able to manage the delivery of the targeted advertisements across multiple platforms to a targeted user as will be described in more detail below.

The centralized management system 400 is also able to communicate with a computing device 408. The computing device 408 may control a traditional advertising platform 410 such as direct mailers, electronic mail, or an outbound call center. The centralized management system 400 may direct the computing device 408 to initiate a phase of an advertising campaign through the traditional advertising platform 410 to the targeted users or any one of the targeted users. The centralized management system 400 may send the information, i.e. the advertisement, to be used by traditional advertising platform 410.

The centralized management system 400 may also control the timing of when the computing device 408 initiates the campaign through the traditional advertising platform 410. The computing device 408 may report back to the centralized management system 400 confirming the execution of the advertising through the traditional advertising platform 410.

A user 412 may enroll with the centralized management system 400 by completing a profile assessment. This may be accomplished via an online survey, personal interview, or any similarly related methodologies. During the enrollment process, the user 412 may provide information relating to his or her profile, which is stored by the centralized management system 400. As mentioned previously, the profile may include information regarding the age of the user 412, the sex of the user 412, income of the user 412, marital and family status of the user 412, the race of the user 412, the native language of the user 412, the credit rating of the user 412, hobbies of the user 412, interests of the user 412, or any other information that can be used to direct targeted advertisements to the user 412.

During the enrollment process, the user 412 may also provide a reference sample for biometric identification purposes. The reference sample may include a reference sample suitable for identifying the user 412 using any biometric recognition technology, including, without limitation, fingerprint recognition, retina recognition, heartbeat recognition, voice recognition, face recognition, and any other technology now known or known in the future that utilizes a measurable, physical characteristic or personal behavioral trait that may be used to recognize the identity, or verify the claimed identity, of a user. The user 412 may also be required to submit information for use with other personal identification technologies, such as passwords, logins, identification numbers, and challenge questions-all of which can be used to identify the user 412.

In return for enrollment, the user 412 may be provided with one or more platforms through which the advertisements may be delivered. Some of the platforms provided to the user 412 may be a type of electronic device. FIG. 4 illustrates examples of some of the suitable platforms in the form of electronic devices that may be provided to the user 412 in return for enrollment with the centralized management system 400. These electronic devices may include a computer 414, a cell phone 416, and a television 418. In addition, the user 412 may be provided with an aftermarket box 420 for enabling a traditional television 422 to be used in accordance with the present disclosure.

Each of the computer 414, phone 416, television 418, and box 420, may have integrated components for enabling two-way electronic communications with the centralized management system 400. These communications may occur over a network, such as the Internet. The centralized management system 400 is able to deliver appropriate targeted advertisements to each of the computer 414, phone 416, the television 418, and the box 420. The targeted advertisements are saved in a storage medium associated with each of the computer 414, phone 416, television 418, and the box 420 for later use. For this reason, it will be appreciated that a targeted advertisement may be transmitted in a format suitable for rendering on the electronic device to which it is sent. In this manner, the present disclosure is able to deliver advertisements across multiple platforms to the same user.

The computer 414 may include a keyboard 414A, a mouse 414B, a remote control 414C and a camera 414D. The keyboard 414A, mouse 414B and the remote control 414C may each include a biometric sensor for determining the identification of the user 412. The biometric sensor may include, for example, a fingerprint scanner, heartbeat scanner, or a microphone used to capture the voice of the user 412. In one embodiment of the present disclosure, the identity of the user 412 is confirmed passively. For example, the fingerprint scanner may be located on a control button such that by using the control button, the fingerprint of the user 412 is automatically and passively captured. In another embodiment, the identity of the user is captured actively. For example, the user 412 may be required to speak such that the voice of the user 412 may be captured for recognition. The camera 414D may be used to capture an image of the face of the user 412 for use with facial recognition techniques.

The television 418 may include a remote control 418A. The remote control 418A may include a biometric sensor, including, for example, a fingerprint scanner, a heartbeat scanner, or a microphone. In addition, a camera may be incorporated into the remote control 418A for enabling the use of facial recognition techniques. Once a biometric characteristic or trait is captured, the remote control 418A may transmit this information to the television 418. In addition, the remote control 418A may be used for content selection.

The box 420, attached externally to a conventional television 422, may also include a biometric sensor, including, for example, a fingerprint scanner, a heartbeat scanner, or a microphone. In addition, a camera may be incorporated into the box 420 for enabling the use of facial recognition techniques. The box 420 may use the information to identify the user 412.

It will be appreciated that the use of the biometric recognition techniques allow for the positive identification of instances when the user 412 is actually using the electronic devices, namely the computer 414 and the televisions 418 and 422. Further, these recognition techniques ensure that the targeted advertisements are rendered to the user 412 and not some other party that happens to use any of the electronic devices shown in FIG. 4.

It will be appreciated, that each user of an electronic device may be required to enroll with the centralized management system 400. For example, all of the members of a household may enroll with the system 400. In this case, targeted advertisements for each household member may be sent to the electronic devices 414, 418, and 420 shown in FIG. 4.

Further, since the targeted advertisements are stored locally at each electronic device, the targeted advertisements can be rendered to the appropriate user 412 when it is confirmed that the user 412 is actually using the electronic device through the identification techniques described herein. In other words, a targeted advertisement may not be rendered until it is confirmed that the user 412 is actually using the one of the electronic devices 414, 418, and 420 shown in FIG. 4.

The manner in which the targeted advertisements are rendered to the user 412 will now be explained for one exemplary embodiment of the present disclosure. In regards to the computer 414, the targeted advertisements may be rendered to the user 412 anytime that the user 412 is confirmed to be using the computer 414 through a biometric recognition technique or another identification technique. In addition, the computer 414 may receive an incoming content stream over a network from a content provider, such as an internet service provider. In one embodiment, integrated modules in the computer 414 monitors the incoming content stream for targeted advertisement placement opportunities. The computer 414 may be able to replace an advertisement in the content stream with a targeted advertisement directed to the user 412. For example, in the case where the content stream includes a banner ad, the computer 414 may replace the banner ad in the content stream, with a targeted advertisement banner ad. In another embodiment, the incoming content stream is monitored at a router level instead of at the computer 414. The advertisement placement can then take place at the router level in the same manner described herein. In another embodiment, the incoming content stream is routed through a proprietary server or gateway. The advertisement placement can take place at this proprietary server or gateway in the same manner described herein. Thus, it should be understood that advertisement placement into a content stream can take place at any point along the path of the content stream between the content provider and the electronic device which renders the content stream. Further, the targeted advertisement placement may take place at the content provider prior to transmission.

Typically, the user 412 never sees the original banner ad transmitted in the content stream, since it is replaced with the targeted advertisement sent by the centralized management system 400. This placement process is facilitated by the fact that the target advertisements are stored locally on the computer 414, a router, or proprietary server, as the case may be. The present disclosure is able to be used to replace other advertisements typically found on webpages. In addition, the targeted advertisements may be inserted into computer applications running on the computer 414. The computer applications may include computer games and the like.

In regards to the television 418, the targeted advertisements may be rendered to the user 412 anytime that the user 412 is confirmed to be watching the television 418 through a biometric recognition technique or another identification technique. For example, the biometric sensor on the remote control 418A may assist in identifying the user 412. The television 418 may have the necessary components for storing and rendering the targeted advertisements integrated into the television 418. The television 418 may also have the necessary components for communicating with the centralized management system 400 integrated therein.

In one embodiment, after the positive confirmation that the user 412 is using the television 418, the television 418 monitors an incoming content stream for advertisement placement opportunities. The incoming content stream may include, without limitation, broadcast television signals, satellite signals, cable signals, IPTV signals, signals from gaming consoles (Xbox, Playstation, Nintendo), and signals from VCR, DVD, Blue-Ray and HD DVD players. The advertisement placement opportunities may be recognized from embedded signals in the content stream, a programming schedule, or by any other means as previously described.

Once a targeted advertisement placement opportunity has been identified, a targeted advertisement directed specifically to the user 412 is retrieved from a local storage medium and rendered to the user 412 in accordance with the targeted advertisement placement opportunity. Alternatively, the targeted advertisement may be pre-buffered by the television 418 for nearly instantaneous rendering. The rendering of the targeted advertisement may involve displacing an advertisement in the incoming content stream. However, the user 412 typically will not know that an advertisement in the content stream has been displaced by a targeted advertisement as it appears to be part of the normal content stream.

In regards to the television 422, it may not have the integrated components to store and render targeted advertisement to the user 412. The use of the box 420, which has the components necessary for storing and rendering the targeted advertisements received from the centralized management system 400, allows for the placement of the targeted advertisements in a manner similar to that described in relation to television 418. Further, the box 420 may include biometric recognition technologies for positively identifying when the user 412 is watching the television 422. It will be appreciated that the use of box 420 allows the present disclosure to be used with off-the-shelf consumer products, such as television 422. The box 420 can be adapted to function with other types of electronic devices.

In regards to the cellular phone 416, the targeted advertisements may be rendered to the user 412 at anytime on a display of the phone 416. Further, the phone 416 may not require the use of a biometric recognition technology due the fact the cellular phones typically do not have multiple users. However, the use of a biometric recognition technology or other identification technique with a cellular phone is within the scope of the present disclosure. The targeted advertisements may be delivered over a cellular phone network from the centralized management system 400. Prior to rendering, the targeted advertisement may be stored in a memory device of the phone 416.

Each of the electronic devices, i.e., computer 414, phone 416, television 418, and box 420 may report the rendering of a targeted advertisement to the user 412 back to the centralized management system 400. This reporting or feedback is particularly useful in managing an advertising campaign directed to the user 412. For example, once it has been determined that an advertisement has been rendered to the user 412, using any of the electronic devices, computer 414, phone 416, box 420, and television 418, the centralized management system 400 may implement another phase of an advertising campaign. For example, the centralized management system 400 may instruct that the computing device 408 implement a follow-up advertisement to the user 412 using a traditional advertising platform 410, e.g., a direct mailer, as previously described.

Likewise, the ability of the electronic devices illustrated in FIG. 4, i.e., the computer 414, phone 416, television 418, and box 420 to provide reports or feedback allows for reports to be sent to computing device 406. Thus, if computing device 406 is operated by advertisers, the advertisers are able to track the progress of the placement of their targeted advertisements in virtually real-time. The same applies if the computing device 406 is operated by a content provider.

Each of the electronic devices shown in FIG. 4, i.e., the computer 414, phone 416, television 418, and box 420 may also be able to identify the provider or owner of the content stream into which a targeted advertisement is placed. This may be done with or without the assistance of the centralized data system 400. As previously discussed, this may be accomplished via embedded coding in the content stream. Alternatively, this may be accomplished via consulting a programming schedule or through mapping data points in the content stream and referring to a look-up table.

As mentioned, the identification of the user 412 may occur passively or actively through the integrated components of the electronic devices, i.e., the computer 414, phone 416, television 418, and box 420, shown in FIG. 4. The integrated components in the electronic devices shown in FIG. 4 may take the form of the components shown in relation to the local management system 202 shown in FIG. 2. Typically, the present disclosure captures the required identification data through the normal use of the electronic devices by the user 412.

The centralized management system 400 may comprise several computing devices to accomplish the features described herein. The centralized management system 400 may take the form of the centralized management system 110 illustrated in FIGS. 1 and 3. Additionally, the centralized management system 400 may comprise various servers, including application servers, file transfer servers, and database servers.

A computing device suitable for use as part of the centralized management system 400 will now be described. It will be appreciated that this same description may describe a suitable form for computer 414. The computing device may have various forms, including a desktop PC, a dedicated server, a laptop or a portable tablet form, or a hand held form. The features of the computing device described herein may be integrated or separable from the computing device. For example, while the computing device may have a monitor, it may be integrated into the computing device, such as the case of a laptop or tablet type computer.

The computing device suitable for use as part of the centralized management system 400 or computer 414 may include a system memory and a system bus that interconnects various system components including the system memory to a processing unit. The system bus may be any of several types of bus structures including a memory bus or memory controller, a peripheral bus, and a local bus using any of a variety of bus architectures as is known to those skilled in the relevant art. The system memory may include read only memory (ROM) and random access memory (RAM). A basic input/output system (BIOS), containing the basic routines that help to transfer information between elements within the computing device, such as during start-up, is stored in the ROM. The computing device may further include a hard disk drive for reading and writing information to a hard disk, a magnetic disk drive for reading from or writing to a removable magnetic disk, and an optical disk drive for reading from or writing to a removable optical disk such as a CD ROM, DVD, or other optical media.

It will be appreciated that the hard disk drive, magnetic disk drive, and optical disk drive may be connected to the system bus by a hard disk drive interface, a magnetic disk drive interface, and an optical disk drive interface, respectively. The drives and their associated computer-readable media provide nonvolatile storage of computer readable instructions, data structures, program modules and other data for the computing device. Although the exemplary environment described herein employs a hard disk, a removable magnetic disk, and a removable optical disk, it will be appreciated by those skilled in the relevant art that other types of computer readable media which can store data that is accessible by a computer, such as magnetic cassettes, flash memory cards, digital video disks, Bernoulli cartridges, random access memories, read only memories, and the like, may also be used in the exemplary operating environment.

A number of program modules may be stored on the hard disk, magnetic disk, optical disk, ROM or RAM, including an operating system, one or more applications programs, other program modules, and program data. The application programs may include programs suitable for accomplishing the features and tasks described herein with relation to the centralized management system 400 or the computer 414. A user may enter commands and information into the computing device through input devices such as a keyboard and a pointing device, such as a mouse. These and other input devices are often connected to the processing unit through a serial port interface that is coupled to the system bus. Increasingly, such devices are being connected by the next generation of interfaces, such as a universal serial bus interface with a USB port, and to which other hubs and devices may be connected. Other interfaces (not shown) that may be used include parallel ports, game ports, and the IEEE 1394 specification.

A monitor or other type of display device is also connected to the system bus via an interface, such as a video adapter. In addition to the monitor, the computing device typically includes other peripheral output or input devices. For example, an ultra slim XGA touch panel may be used. A resistive finger touch screen may also be used.

Further, it is well understood by those having the relevant skill in the art that a keyboard, scanner, printer, external drives (e.g., hard, disk and optical) and appointing device may be connected to the computing device suitable for use as part of the centralized management system 400 or the computer 414. In addition, the computing device may be capable of communicating with a network and sending/receiving audio, video and data.

The computing device may operate in a networked environment using logical connections to one or more remote computers or electronic devices as described herein. The types of connections between networked devices include dial up modems, e.g., a modem may be directly used to connect to another modem, ISDN, xDSL, cable modems, wireless and include connections spanning users connected to the Internet. The remote computer may be another personal computer, a server, a router, a network PC, a peer device or other common network node, and typically includes many or all of the elements described in relation to the computing device. In particular, the computing device may be able to communicate with the electronic devices described herein.

When used in a LAN networking environment, the computing device is connected to a local network through a network interface or adapter. The computing device may also connect to the LAN via through any wireless communication standard, such as the 802.11 wireless standard. When used in a WAN networking environment, the computing device typically uses modem or other means for establishing communications over the wide area network. It should be noted that the modem may be internal or external and is connected to the system bus. It will be appreciated that the network connections described herein are exemplary and other means of establishing a communications link between the computers may be used, e.g., from a LAN gateway to WAN.

Generally, the data processors of the computing device suitable for use as part of the centralized management system 400 or the computer 414 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The disclosure described herein includes these and other various types of computer-readable storage media when such media contain instructions or programs for implementing the steps described herein in conjunction with a microprocessor or other data processor. The disclosure also includes the computing device itself when programmed according to the methods and techniques described herein.

Figure 5:
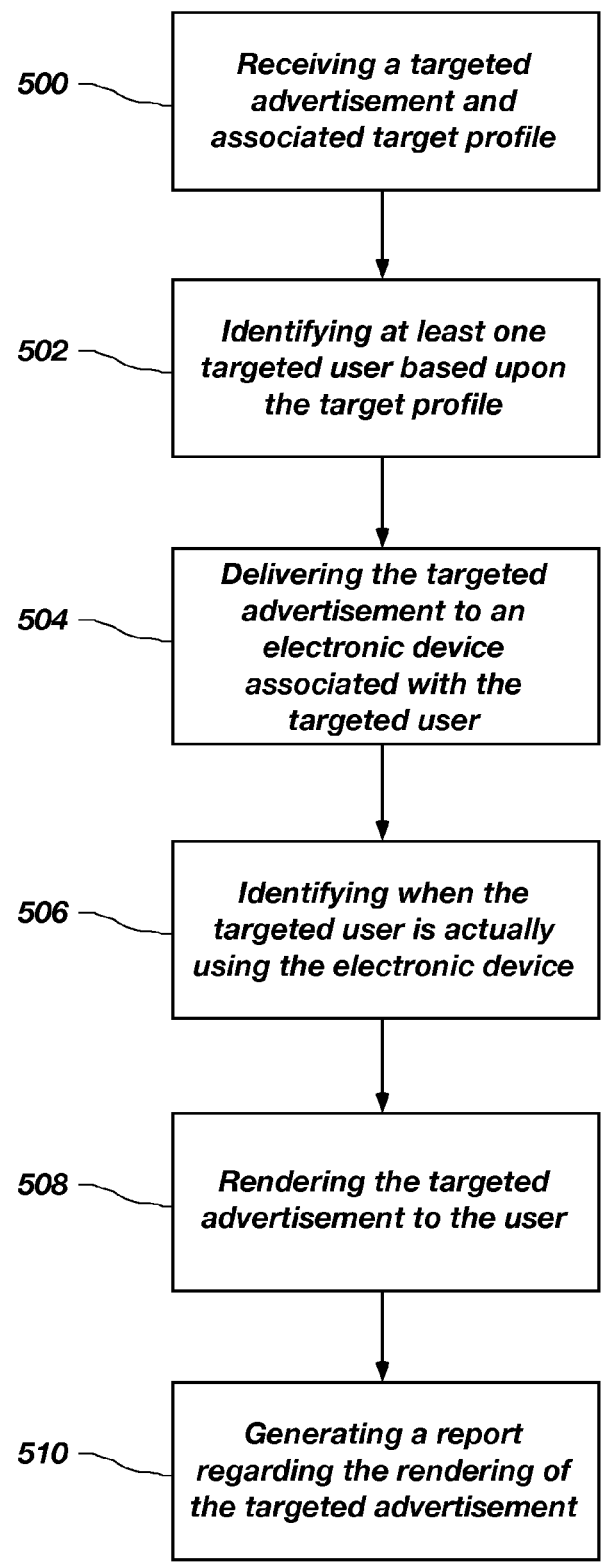
FIG. 5 is a flow chart according to an embodiment of the present disclosure illustrating the placement of a targeted advertisement to a user of an electronic device.

Referring now to FIG. 5, there is depicted a flow diagram according to one embodiment of the present disclosure. At step 500, a targeted advertisement along with an associated target profile is received at a centralized management system. The targeted advertisement and the target profile may be transmitted either separately or together over a computer network. Alternatively, the targeted advertisement and the target profile may be delivered to the centralized management system on a portable storage medium. The targeted advertisement and the target profile are then loaded onto the centralized management system. The centralized management system may comprise a computer database having a plurality of user profiles stored therein.

At step 502, a computer application running on the centralized management system compares the target profile to the user profiles in order to determine a group of targeted users. The comparison should return at least one targeted user. The targeted users have a profile that match or are closely matched to the target profile.

At step 504, the targeted advertisements are delivered to electronic devices of the users having a profile that matches the target profile. This may be accomplished by transmitting the targeted advertisement from the centralized management system to one or more electronic devices associated with each targeted user.

At step 506, the electronic device confirms when the targeted user is actually using the electronic device, and, at step 508, the electronic device renders the targeted advertisement to the targeted user. At step 510, a report regarding the rendering of the targeted advertisement is generated. The report may be electronically transmitted back to the centralized management system.

Figure 6:
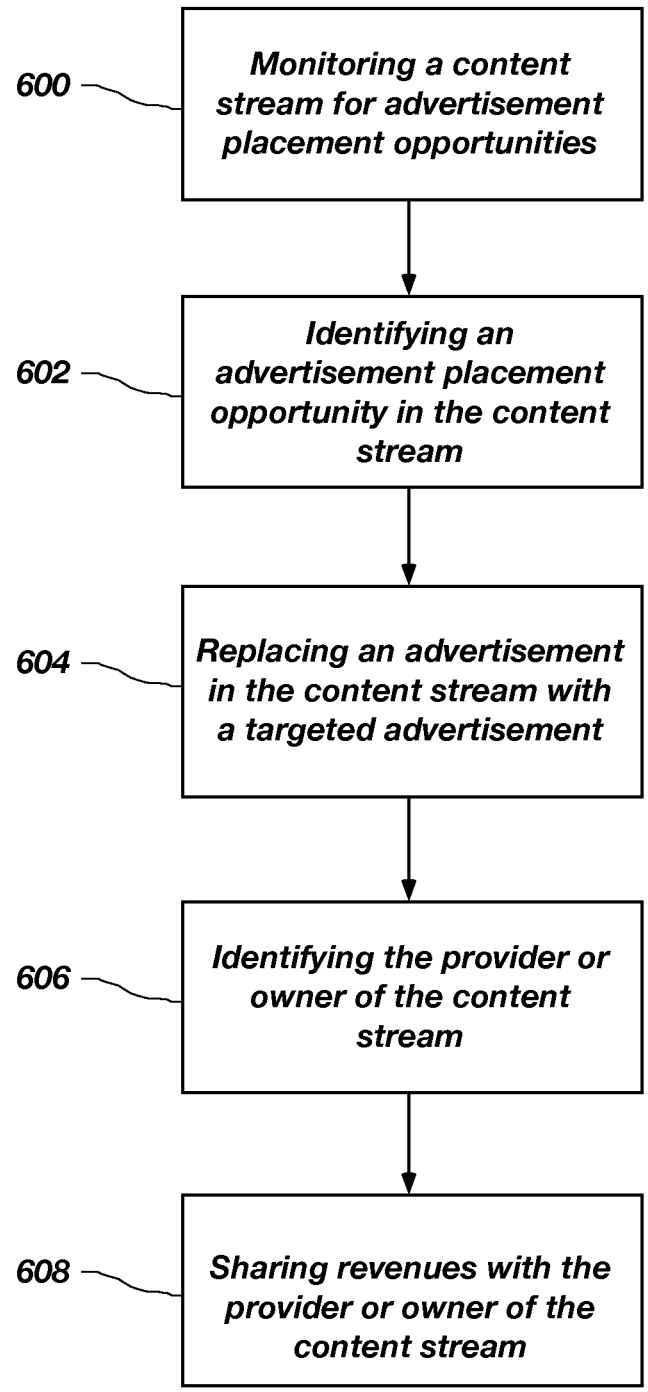
FIG. 6 is a flow chart according to an embodiment of the present disclosure illustrating the placement of a targeted advertisement into a content stream.

Referring now to FIG. 6, there is depicted a flow diagram according to one embodiment of the present disclosure. At steps 600 and 602, a content stream is monitored for an advertisement placement opportunity. The advertisement placement opportunity may be a regular advertising slot in the content stream.

At step 604, an advertisement in the content stream is replaced with a targeted advertisement. This may be accomplished by switching an input from a source carrying the content stream to a source carrying the targeted advertisement. The targeted advertisement may be pre-buffered such that the switch to targeted advertisement may be accomplished on-the-fly and without interruption. After the targeted advertisement has been rendered, the source of the input may be immediately switched back to the source carrying the content stream. This step should provide a seamless integration of the targeted advertisement into the content stream, to the extent possible, such that the switch is unnoticeable to a user.

At step 606, the content owner or content provider of the content stream is identified. This may require extracting embedded codes from the content stream. In addition, other recognition techniques may be employed, including mapping data points in the content stream and comparing these data points to a known data point mappings in a look-up table. Alternatively, a programming schedule may be employed to identify the content owner or content provider.

At step 608, revenues generated by the targeted advertisement placement may be shared with the content owner and/or content provider. In this manner, the content owner and/or providers are compensated for the displacement of their normal advertisements in the content stream.

Figure 7:
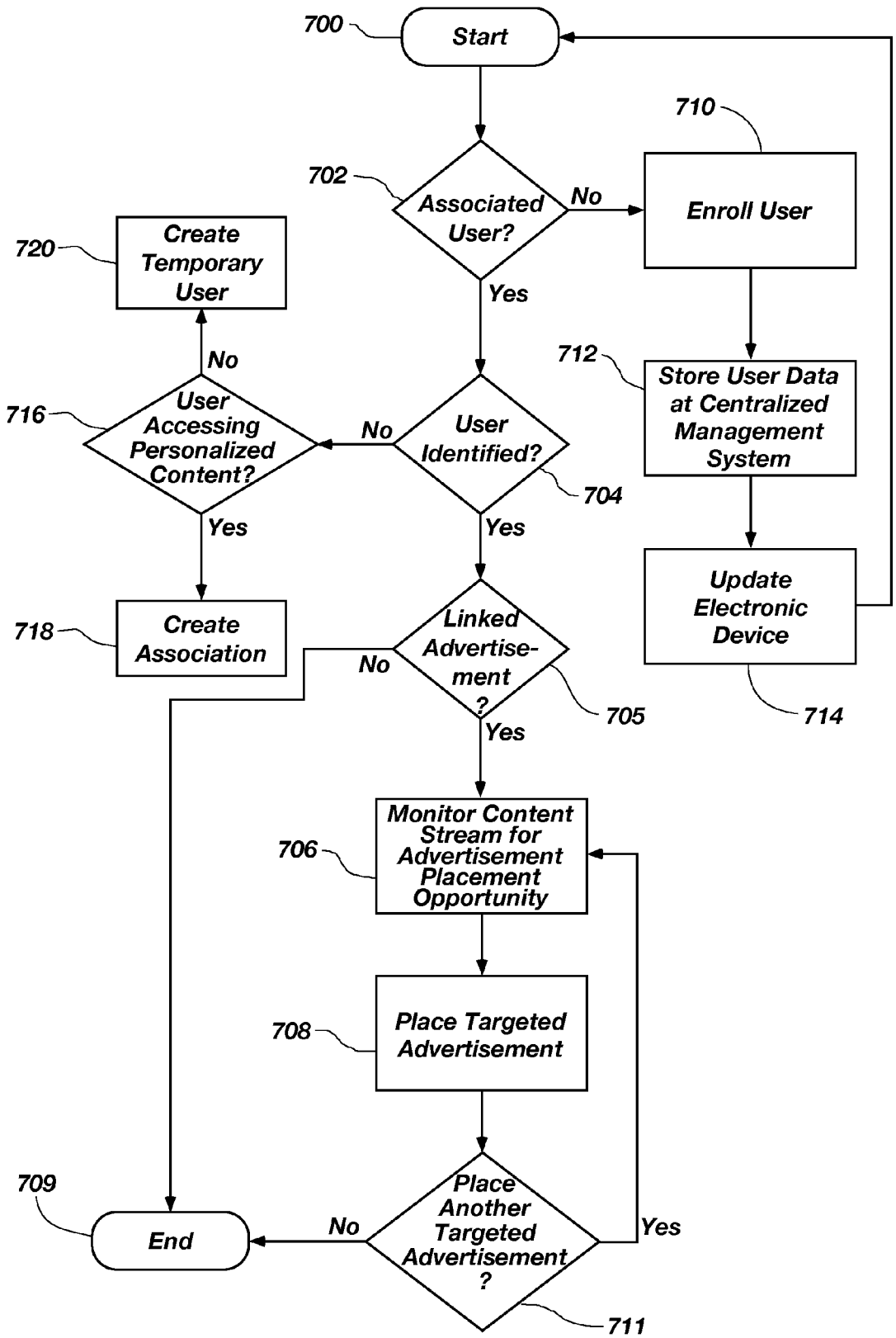
FIG. 7 is a flow chart according to another embodiment of the present disclosure illustrating the placement of a targeted advertisement based upon the identity of a user of an electronic device.

Referring now to FIG. 7, there is depicted a flow diagram according to one embodiment of the present disclosure. At step 700, a user, referred to herein as the "current user" for purposes clarity, interacts with an electronic device. The electronic device may have the ability to place targeted advertisements.

At step 702, the electronic device determines whether any enrolled users have been previously associated with the electronic device. An enrolled user is a person who has completed a profile assessment and, in one embodiment, provided a biometric reference sample for identification purposes. If it is determined that an enrolled user has been associated with the electronic device, at step 704, the electronic device will attempt to confirm whether the current user of the electronic device is one of the enrolled users. This may be accomplished through a biometric recognition technique, such as a fingerprint scan. In one embodiment, the current user's fingerprint scan will compared to the reference samples of the enrolled users to make this determination.

If the current user of the electronic device is confirmed to be an enrolled user, then at step 705, a determination is made whether any targeted advertisements are linked to the user. If no targeted advertisements are linked to the current user, then the branch ends at step 709. If it is determined that there is a targeted advertisement linked to the user, then, at step 706, a content stream being rendered by the electronic device is monitored to recognize an advertisement placement opportunity. Once the advertisement placement opportunity is recognized, then, at step 708, a targeted advertisement is rendered to the user in accordance with the advertisement placement opportunity. At step 711, it is determined whether another targeted advertisement is available for placement. If yes, the process loops back to step 706. If no, then this branch then ends at step 709.

If at step 702, it is determined that there are no enrolled users associated with the electronic device, at step 710, the current user of the electronic device may be enrolled. This may include gathering data about a profile assessment of the current user and capturing a biometric reference sample, such as a fingerprint scan. The current user's data, including the current user's profile assessment and biometric reference sample, may then be transmitted and stored at a centralized management system at step 712.

At step 714, the centralized management system may then update the electronic device to thereby associate an enrolled user with the electronic device. This branch ends by returning to step 700.

If at step 704, the current user cannot be matched to any of the enrolled users, at step 716, a determination is made whether the current user is accessing personalized content of any of the enrolled users. If the user is accessing personalized content, then, at step 718, an association between the current user and an enrolled user, to whom the personalized content is typically associated, is created. Then, targeted advertisements may be delivered to the current user at steps 706 and 708. If the current user is not accessing personalized content, then at step 720, a temporary guest registration may be granted to the current user to thereby allow the current user to operate the electronic device.

Figure 8:
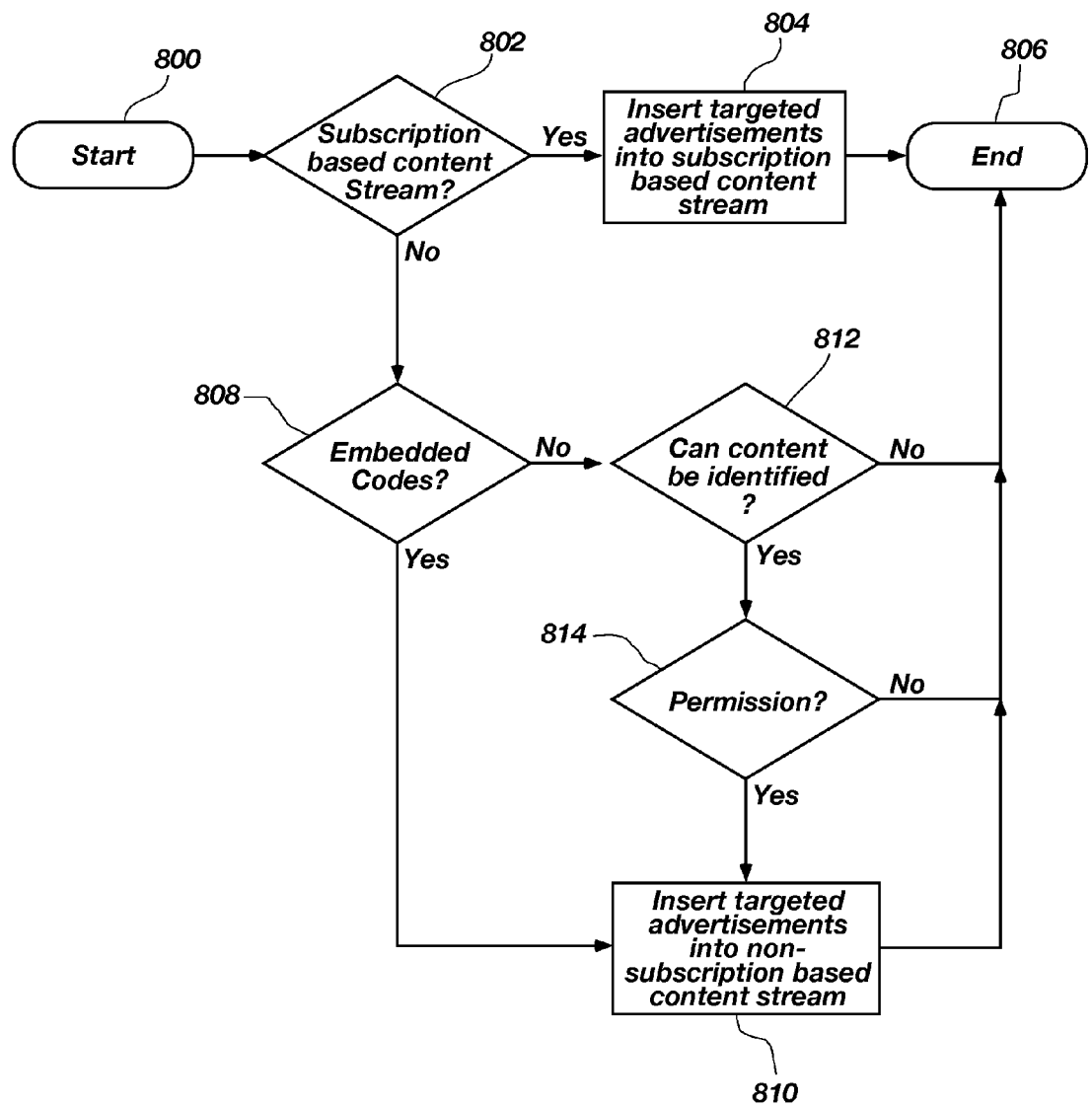
FIG. 8 is a flow chart according to another embodiment of the present disclosure illustrating the placement of a targeted advertisement based upon the source of the content stream.

Referring now to FIG. 8, there is depicted a flow diagram according to one embodiment of the present disclosure. At step 800, it is determined that a user is using an electronic device. At step 802, it is determined whether the content stream being accessed by the user is a subscription-based content stream or a third-party content stream. A subscription-based content stream may be a content stream whose content is delivered specifically to the user at the user's request. A third-party content stream may be a delivered using a broadcast type network.

If the content stream is a subscription-based content stream, at step 804, targeted advertisements are inserted into the subscription-based content stream and the subscription-based content stream is rendered on the electronic device. This branch then ends at step 806.

If the content stream being accessed by the user is generated from a non-subscription based content stream, at step 808, it is determined whether the non-subscription based content stream has embedded codes in the non-subscription based content stream. If embedded codes are present in the non-subscription based content stream, then at step 810, targeted advertisements may be placed into the non-subscription based content stream. If no embedded codes are found in the non-subscription based content stream, then at step 812, it is determined whether the content can be identified through another method, such as data point mapping of the non-subscription based content stream. If the content cannot be identified, this branch ends at step 806.

If the content can be identified at step 802, then at step 814, it is determined whether permission from the content owner and/or provider to insert targeted advertisements has been obtained. If no permission has been obtained, then this branch ends at step 806. If permission has been obtained, then the targeted advertisements are inserted into the non-subscription based content stream at step 810 and the branch ends at step 806.

Those having ordinary skill in the relevant art will appreciate the advantages provide by the features of the present disclosure. For example, it is a feature of the present disclosure to provide a system for delivering targeted advertisements to a user of an electronic device. Another feature of the present disclosure is to provide a confirmation or verification that a targeted advertisement has been rendered to a targeted user. It is a further feature of the present disclosure, in accordance with one aspect thereof, to provide revenue sharing with an owner or provider of a content stream into which a targeted advertisement has been placed. As used in the following claims, the term "content stream" may be construed to incorporate subscription-based content streams as discussed above.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method for placing targeted advertisements, said method comprising the steps of:
   receiving, at a subscription module of an electronic device, enrollment information from a user of the electronic device;
   determining, at a user identification module of the electronic device, an identity of the user of the electronic device;
   selecting, at an advertisement selection module of the electronic device, a targeted advertisement linked to the identity of the user, wherein a centralized management system controls which targeted advertisement is selected based on direction provided by an advertisement source;
   storing the targeted advertisement in a storage medium for storing the targeted advertisement, said storage medium being included within the electronic device;
   recognizing, at an opportunity detection module of the electronic device, a targeted advertisement placement opportunity in relation to a content stream, comprising the step of monitoring the content stream;
   identifying a provider of the content stream;
   determining whether permission from an owner of the content stream to insert the targeted advertisement has been obtained;
   identifying when the user is actually using the electronic device;
   causing, at a switching module of the electronic device, the targeted advertisement's rendering on an output module of the electronic device in accordance with the targeted advertisement placement opportunity by displacing an advertisement in the content stream;
   causing a targeted advertisement to be sent to the user over a platform other than the electronic device, wherein said platform is enrolled, wherein the platform other than the electronic device is selected by the advertisement source from the group consisting of a television, a computer, the internet, a cell phone, a direct mailer, an email message, an outbound call center, an aftermarket box for attaching to a television, a DVD, a VHS tape, a gaming platform, a personal video recorder, an IPTV stream, and a digital music player;
   managing, at a campaign management module of the centralized management system, a campaign of targeted advertisements sent to a user, wherein the campaign comprises a plurality of phases, each phase comprising an advertisement using a different platform;
   generating a report regarding the rendering of the targeted advertisements on the electronic devices.

2. The method of claim 1, wherein the centralized management system controls which targeted advertisement is selected using demographic and behavioral information relating to the user.

3. The method of claim 1, wherein the step of causing a targeted advertisement to be sent to the user over a platform other than the electronic device that is selected by the advertisement source, occurs upstream from the storage medium and prior to the stop of storing the targeted advertisement in a storage medium.

4. A method for placing targeted advertisements, said method comprising the steps of:
   receiving, at a subscription module of an electronic device, enrollment information from a user of the electronic device;
   determining, at a user identification module of the electronic device, an identity of the user of the electronic device;
   selecting, at an advertisement selection module of the electronic device, a targeted advertisement linked to the identity of the user, wherein a centralized management system controls which targeted advertisement is selected based on direction provided by an advertisement source;
   identifying a provider or content owner of a content stream;
   determining whether permission from an owner of the content stream to insert the targeted advertisement has been obtained;
   identifying when the user is actually using the electronic device;
   causing a targeted advertisement to be sent to the user over a platform other than the electronic device, wherein said platform is enrolled, wherein the platform other than the electronic device is selected by the advertisement source from the group consisting of a television, a computer, the internet, a cell phone, a direct mailer, an email message, an outbound call center, an aftermarket box for attaching to a television, a DVD, a VHS tape, a gaming platform, a personal video recorder, an IPTV stream, and a digital music player;
   managing, at a campaign management module of the centralized management system, a campaign of targeted advertisements sent to a user, wherein the campaign comprises a plurality of phases, each phase comprising an advertisement using a different platform;
   generating a report regarding the rendering of the targeted advertisements on the electronic devices.

5. A method for placing targeted advertisements, said method comprising the steps of:
   receiving, at a subscription module of an electronic device, enrollment information from a user of the electronic device;
   determining, at a user identification module of the electronic device, an identity of the user of the electronic device;
   selecting, at an advertisement selection module of the electronic device, a first targeted advertisement linked to the identity of the user, wherein a centralized management system controls which targeted advertisement is selected based on direction provided by an advertisement source;
   identifying a provider or content owner of a content stream;
   determining whether permission from an owner of the content stream to insert the targeted advertisement has been obtained;
   identifying when the user is actually using the electronic device;
   causing, at a switching module of the electronic device, the first targeted advertisement's rendering on an output module of the electronic device in accordance with the targeted advertisement placement opportunity by displacing an advertisement in the content stream;
   causing a second targeted advertisement to be sent to the user over a platform other than the electronic device, wherein the second targeted advertisement is related to the first targeted advertisement in that both of said first and second targeted advertisements are part of an advertising campaign, wherein the platform other than the electronic device is selected by the advertisement source from the group consisting of a television, a computer, the internet, a cell phone, a direct mailer, an email message, an outbound call center, an aftermarket box for attaching to a television, a DVD, a VHS tape, a gaming platform, a personal video recorder, an IPTV stream, and a digital music player;

managing, at a campaign management module of the centralized management system, a campaign of targeted advertisements sent to a user, wherein the campaign comprises a plurality of phases, each phase comprising an advertisement using a different platform;

generating a report regarding the rendering of the targeted advertisements on the electronic devices.

6. A method for placing targeted advertisements, said method comprising the steps of:

receiving, at a subscription module of an electronic device, enrollment information from a user of the electronic device;

determining, at a user identification module of the electronic device, an identity of the user of the electronic device;

selecting, at an advertisement selection module of the electronic device, a first targeted advertisement linked to the identity of the user, wherein a centralized management system controls which targeted advertisement is selected based on direction provided by an advertisement source;

identifying a provider or content owner of a content stream;

determining whether permission from an owner of the content stream to insert the targeted advertisement has been obtained;

causing, at a switching module of the electronic device, the first targeted advertisement's rendering on an output module of the electronic device in accordance with the targeted advertisement placement opportunity by replacing an advertisement in the content stream;

causing a second targeted advertisement to be sent to the user over a platform other than the electronic device, wherein the second targeted advertisement is related to the first targeted advertisement in that both of said first and second targeted advertisements are part of an advertising campaign, wherein the platform other than the electronic device is selected by the advertisement source from the group consisting of a television, a computer, the Internet, a cell phone, a direct mailer, an email message, an outbound call center, an aftermarket box for attaching to a television, a DVD, a VHS tape, a gaming platform, a personal video recorder, an iPTV stream, and a digital music player;

managing, at a campaign management module of the centralized management system, a campaign of targeted advertisements sent to a user, wherein the campaign comprises a plurality of phases, each phase comprising an advertisement using a different platform;

generating a report regarding the rendering of the targeted advertisements on the electronic devices.

7. A method for placing targeted advertisements, said method comprising the steps of:

receiving, at a subscription module of an electronic device, enrollment information from a user of the electronic device;

determining, at a user identification module of the electronic device, an identity of the user of the electronic device;

selecting, at an advertisement selection module of the electronic device, a first targeted advertisement linked to the identity of the user, wherein a centralized management system controls which targeted advertisement is selected based on direction provided by an advertisement source;

identifying a provider or content owner of a content stream;

determining whether permission from an owner of the content stream to insert the targeted advertisement has been obtained;

identifying when the user is actually using the electronic device, and identifying a user based on a proximity of a known user mobile device associated with information selected from the group consisting of a cellular phone number, a serial number, an IP address, a password, a login, and a challenge question, wherein the electronic device operates to determine said user is within viewing range based on said user mobile device interacting with its environment;

causing, at a switching module of the electronic device, the first targeted advertisement's rendering on an output module of the electronic device in accordance with the targeted advertisement placement opportunity by replacing an advertisement in the content stream;

causing a second targeted advertisement to be sent to the user over a platform other than the electronic device, wherein the second targeted advertisement is related to the first targeted advertisement in that both of said first and second targeted advertisements are part of an advertising campaign, wherein the platform other than the electronic device is selected by the advertisement source from the group consisting of a television, a computer, the Internet, a cell phone, a direct mailer, an email message, an outbound call center, an aftermarket box for attaching to a television, a DVD, a VHS tape, a gaming platform, a personal video recorder, an iPTV stream, and a digital music player;

managing, at a campaign management module of the centralized management system, a campaign of targeted advertisements sent to a user, wherein the campaign comprises a plurality of phases, each phase comprising an advertisement using a different platform;

generating a report regarding the rendering of the targeted advertisements on the electronic devices.

* * * * *